Patented Mar. 19, 1935

1,994,597

UNITED STATES PATENT OFFICE 1,994,597

CELLULOSE ACETATE COMPOSITION CONTAINING ETHYLENE CHLORIDE AND A HYDROXYL PLASTICIZER

Cyril J. Staud and Louis M. Minsk, Rochester, N. Y., assignors to Eastman Kodak Company, Rochester, N. Y., a corporation of New York No Drawing. Application May 4, 1932, Serial No. 609,257

2 Claims. (Cl. 106—40)

This invention relates to cellulose acetate compositions, and to solvent mixtures for cellulose acetate. Its object is to provide solvent mixtures which will give clear solutions of cellulose acetate at ordinary room temperatures, from which films of unusual flexibility may be coated. Other objects will hereinafter appear.

Ethylene chloride alone is not a solvent for acetone-soluble cellulose acetate at ordinary room temperatures. In order to produce, at room temperature, cellulose acetate solutions containing ethylene chloride, it has been heretofore thought to be necessary to use a mixture of ethylene chloride and ethyl or methyl alcohol.

We have discovered that certain cellulose acetate plasticizers containing a hydroxyl group are quite unusual in that they may be added in small amounts to ethylene chloride to produce solvent mixtures which dissolve cellulose acetate at room temperature, and that films coated from solution in such solvent mixtures show unusual flexibility. The hydroxyl group in the plasticizer may form part of a carboxyl group. The plasticizers may be liquid or solid at room temperature. Those named hereinafter are related in that they each act with ethylene chloride to give the indicated result.

Examples of the plasticizers containing hydroxyl groups which we may use with ethylene chloride in carrying out our invention are p-tertiary butyl phenol, methyl hydrogen adipate, diacetin, cyclohexanol, trichloro tertiary butyl alcohol, methyl mandelate, butyl tartrate, monoethyl ether of trimethylene glycol, and d-borneol.

The following is illustrative of the manner in which our invention may be carried out. 15 cc. of butyl tartrate is dissolved in 375 cc. of ethylene chloride. 50 grams of acetone-soluble cellulose acetate is added to this solvent mixture, and allowed to stand, with occasional stirring, until a clear solution of cellulose acetate results. While the proportions given are merely illustrative, they are indicative of the relatively small proportions of plasticizer which will form solvent mixtures with ethylene chloride although, of course, increasing proportions of the plasticizer may be used without harm. Similar proportions of the other hydroxyl plasticizers mentioned above produce solvent mixtures with ethylene chloride. Other addition agents may be added to our novel compositions as desired and as apparent to those skilled in the art without in any way affecting the scope of our invention, the essentials thereof only being claimed herein.

A composition of matter prepared as above described may be deposited upon any suitable film-forming surface to form a film or sheet, in a manner well known to those skilled in the art. A film so produced has permanently brilliant transparency and low inflammability. It also has unusual flexibility. For instance, a film coated from the solution described in the above example withstood 24 folds when tested on the modified Schopper fold-tester commonly used in testing cellulose derivative films, whereas a film coated from solution in acetone alone withstood only 4 folds. Films coated from solutions made by dissolving 50 grams of cellulose acetate in a solution of 15 grams of plasticizer in 375 cc. of ethylene chloride showed the following flexibilities when the indicated plasticizers were used:

| Plasticizer Used | Folds Withstood |
|---|---|
| p-Tertiary butyl phenol | 14 |
| Methyl hydrogen adipate | 13 |
| Trichloro tertiary butyl alcohol | 11 |
| Methyl mandelate | 12 |
| Monoethyl ether of trimethylene glycol | 21 |

While we have described the use of our novel cellulose acetate compositions for forming films, it will be obvious to those skilled in the art that they may also be employed to advantage in the manufacture of other cellulose acetate products in which good flexibility is desired, for instance, in the manufacture of wrapping sheets or tissues, or of artificial silk.

What we claim as our invention and desire to be secured by Letters Patent of the United States is:

1. A clear solution consisting of cellulose acetate, ethylene chloride and trichloro tertiary butyl alcohol.

2. A transparent, flexible, cellulose acetate sheet formed by coating from a solution consisting of cellulose acetate, ethylene chloride and trichloro tertiary butyl alcohol.

CYRIL J. STAUD.
LOUIS M. MINSK.